United States Patent
Kim et al.

(10) Patent No.: US 9,604,513 B2
(45) Date of Patent: Mar. 28, 2017

(54) CAP HAVING EXPANDED PAD AND TOWING PIPE MOUNTED TO SAID CAP

(71) Applicant: Hyundai Motor Company, Seoul (KR)

(72) Inventors: Dong-Wook Kim, Whasung-Si (KR); Hyun-Baek Jung, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 14/538,496

(22) Filed: Nov. 11, 2014

(65) Prior Publication Data

US 2015/0137485 A1    May 21, 2015

(30) Foreign Application Priority Data

Nov. 21, 2013    (KR) .......................... 10-2013-142124

(51) Int. Cl.
*B60D 1/60*    (2006.01)

(52) U.S. Cl.
CPC .................................. *B60D 1/605* (2013.01)

(58) Field of Classification Search
CPC ....................................................... B60D 1/605
See application file for complete search history.

(56) References Cited

U.S. PATENT DOCUMENTS 5,320,460 A * 6/1994 Murakami ............. B65D 53/06
                                                                138/89
5,829,482 A * 11/1998 Takabatake ............ B62D 25/24
                                                                138/89

FOREIGN PATENT DOCUMENTS

| JP | 2004-136745 A | 5/2004 |
| JP | 2009-292175 A | 12/2009 |
| JP | 2013-193502 A | 9/2013 |
| KR | 10-0879891 B1 | 1/2009 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

There are provided a cap having an expanded pad and an apparatus having a towing pipe provided with the cap. The cap includes a body having opened ends and an expanded pad attached to an inner circumferential surface of the body. The expanded pad does not close the opened ends of the body before being heated, expands when being heated, and closes the opened ends of the body after being heated. The body includes a ring-shaped ring plate and a plurality of legs that protrudes from one side of the ring plate and spaces apart from each other along a circumference of the ring plate. When the expanded pad is heated, ends of the legs are bent radially outwardly by expansion of the expanded pad. The body includes a head and a screw protruding from one side of the head. The head and screw are opened in a longitudinal direction of the body.

2 Claims, 5 Drawing Sheets

PENETRATING HOLE

FIG. 4A
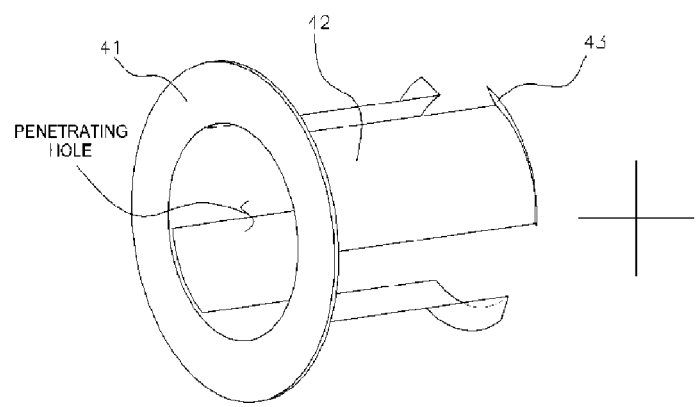
FIG. 4B
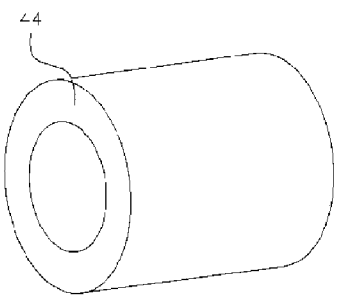
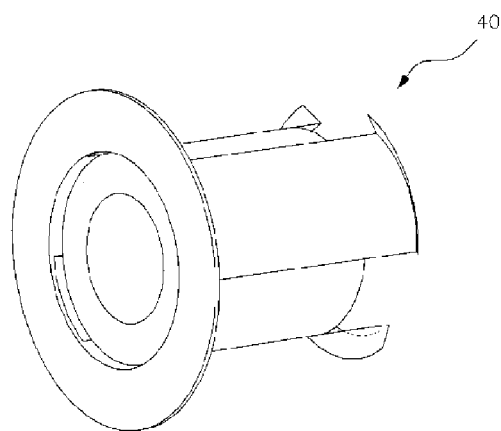
FIG. 4C

FIG. 5A
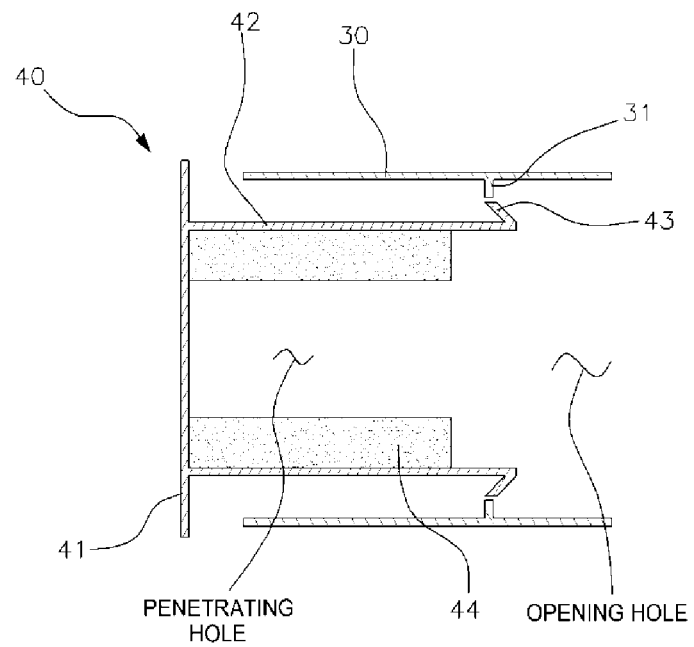
PENETRATING HOLE    OPENING HOLE
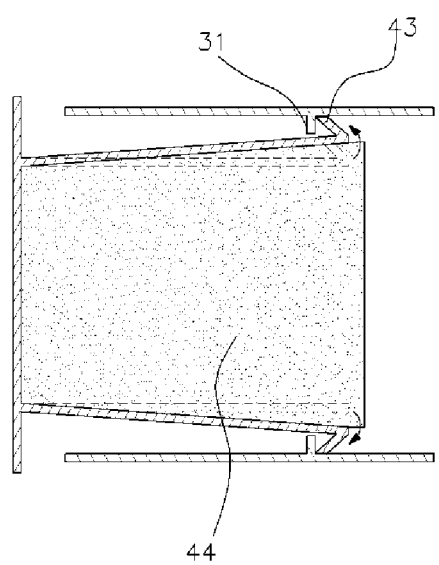
FIG. 5B

CAP HAVING EXPANDED PAD AND TOWING PIPE MOUNTED TO SAID CAP

CROSS-REFERENCE TO RELATED APPLICATIONS

The present application claims priority of Korean Patent Application Number 10-2013-142124 filed on Nov. 21, 2013, the entire contents of which application are incorporated herein for all purposes by this reference.

BACKGROUND OF INVENTION

Field of Invention

The present invention relates to a cap having an expanded pad and an apparatus having a towing pipe provided with the cap. The cap of the present invention includes an expanded pad capable of opening both ends at a low temperature and closing the opening after being heated.

The cap of the present invention can be used by being connected to a towing pipe a device in which both ends need to be opened at the time of manufacturing and to be closed after the manufacturing, for example, a towing pipe in which one side of an opening hole needs to be closed in order to prevent an exhaust gas discharged to the outside of a vehicle from being reintroduced.

Description of Related Art

A towing pipe is a component for connecting a towing hook or a wire to a vehicle body when a vehicle is towed away or is rescued, and is typically attached to front and rear bumpers to be fixed. Further, a screw thread 2 (that can be connected to a screw formed at the towing hook) is formed at an inner circumferential surface of the towing pipe.

However, as illustrated in FIGS. 1A and 1B, since a towing pipe 1 is fixed to a bumper beam 3 and is disposed above an exhaust pipe 4, a vortex is generated near the vehicle due to high-speed traveling of the vehicle, and when there is a pressure difference between inside and outside the vehicle, some of the exhaust gas may be introduced into the vehicle through an opening hole of the towing pipe 1. Accordingly, one end of the opening hole formed in the towing pipe 1 needs to be closed.

However, after final molding is finished, an electro-deposition process and a heating process for drying an electro-deposition liquid remaining in the electro-deposition process are additionally performed on the towing pipe. That is, the towing pipe 1 needs to be maintained in an opened state so as to allow the electro-deposition liquid to pass through the inside of the towing pipe 1 during the electro-deposition process until the electro-deposition process is finished.

Accordingly, there is a demand for development of a cap capable of effectively closing one side of the opening hole of the towing pipe 1 only after the electro-deposition process and a towing pipe provided with the cap.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a cap having an expanded pad capable of opening both ends at a low temperature and closing the both ends after being heated at a high temperature, and an apparatus having a towing pipe provided with the cap.

Various aspects of the present invention provide a cap including a body having opened ends and an expanded pad that is attached to an inner circumferential surface of the body. The expanded pad does not close the opened ends of the body before being heated, expands when being heated, and closes the opened ends of the body after being heated.

The body may include a ring-shaped ring plate and a plurality of legs that protrudes from one side of the ring plate and spaces apart from each other along a circumference of the ring plate. When the expanded pad is heated, ends of the legs may be bent radially outwardly by expansion of the expanded pad.

The body may include a head and a screw that protrudes from one side of the head, and has a screw thread formed on an outer circumferential surface. The body may be formed such that the head and the screw are opened in a longitudinal direction of the body.

Various other aspects of the present invention provide an apparatus including a towing pipe provided with the cap having the above-stated features.

The apparatus may include a cap that includes a body having opened ends and an expanded pad attached to an inner circumferential surface of the body, and a towing pipe connected to one end of the cap. The towing pipe may have an opening hole formed therein and an engagement part protruding from an inner circumferential surface of the opening hole. The expanded pad does not close the opened ends of the body before being heated, expands when being heated, and closes the opened ends of the body after being heated. The body may include a ring-shaped ring plate and a plurality of legs protruding from one side of the ring plate and spacing apart from each other along a circumference of the ring plate. The plurality of legs may include wings formed at ends of the plurality of legs. The plurality of legs may be bent radially outwardly by expansion of the expanded pad such that the wings may come in contact with the engagement part to prevent the plurality of legs from being separated after the expanded pad has expanded.

Alternatively, the towing pipe may include female screw thread formed on an inner circumferential surface of the towing pipe. The body may include a head having an increased diameter and a screw that protrudes from one side of the head and has a screw thread formed at an outer circumferential surface. The head and the screw may be opened in a longitudinal direction of the body, and the screw may be screwed into the female screw thread of the towing pipe.

According to the present invention, since the cap having an expanded pad can be attached to components having various pipe shapes in addition to the towing pipe, it is possible to close an opened state of the component at the time of manufacturing, if necessary. Accordingly, since one side of the towing pipe provided with the cap is closed, it is possible to prevent some of the exhaust gas from being introduced into the vehicle.

That is, since the cap of the present invention includes the expanded pad whose volume is expanded by being heated, the electro-deposition process can be performed on the towing pipe, and it is possible to close the opening hole during the heat-drying process of the electro-deposition liquid without additionally performing a separate process.

The cap of the present invention can be more firmly connected to the towing pipe through screw connecting, and since the legs have fixing force by the expansion of the expanded pad, the cap can be easily attached by simply inserting the cap.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4A, FIG. 4B and FIG. 4C are diagrams illustrating a state where another exemplary cap according to the present invention is assembled.

FIG. 5A and FIG. 5B are diagrams illustrating a state where legs are restricted by an engagement part by the expansion of the expanded pad after the cap of FIG. 4A, FIG. 4B and FIG. 4C enters one side of a towing pipe.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A towing pipe of the present invention is attached to a vehicle body (more specifically, in some embodiments, a bumper beam), an opening hole is formed in a longitudinal direction, and a screw thread is formed at inner circumferential surface of the opening hole so as to allow a towing hook to be screwed. Further, although it will be described that a cap of the present invention is connected so as to shield one side of the opening hole of the towing pipe (a side opposite to a direction in which the towing hook enters), the present invention is not limited to that only the towing pipe is attached.

The cap according to the present invention is characterized in that two or more bodies having different shapes are provided, the bodies have opening holes allowing both ends to be opened to each other in common, an expanded pad attached therein is maintained in an opened state before the expanded pad expands, and when the expanded pad expands, the opening is closed. When the opening hole of the towing pipe provided with the cap of the present invention is opened during an electro-deposition process, and after the electro-deposition process, when the expanded pad is heated during a heat-drying process, a volume of the expanded pad is expanded to close the opening hole, so that introduction of an exhaust gas is blocked.

Hereinafter, a cap having an expanded pad and a towing pipe provided with the cap according to exemplary embodiments of the present invention will be described in more detail with reference to the drawings.

Figures 1A, 1B:
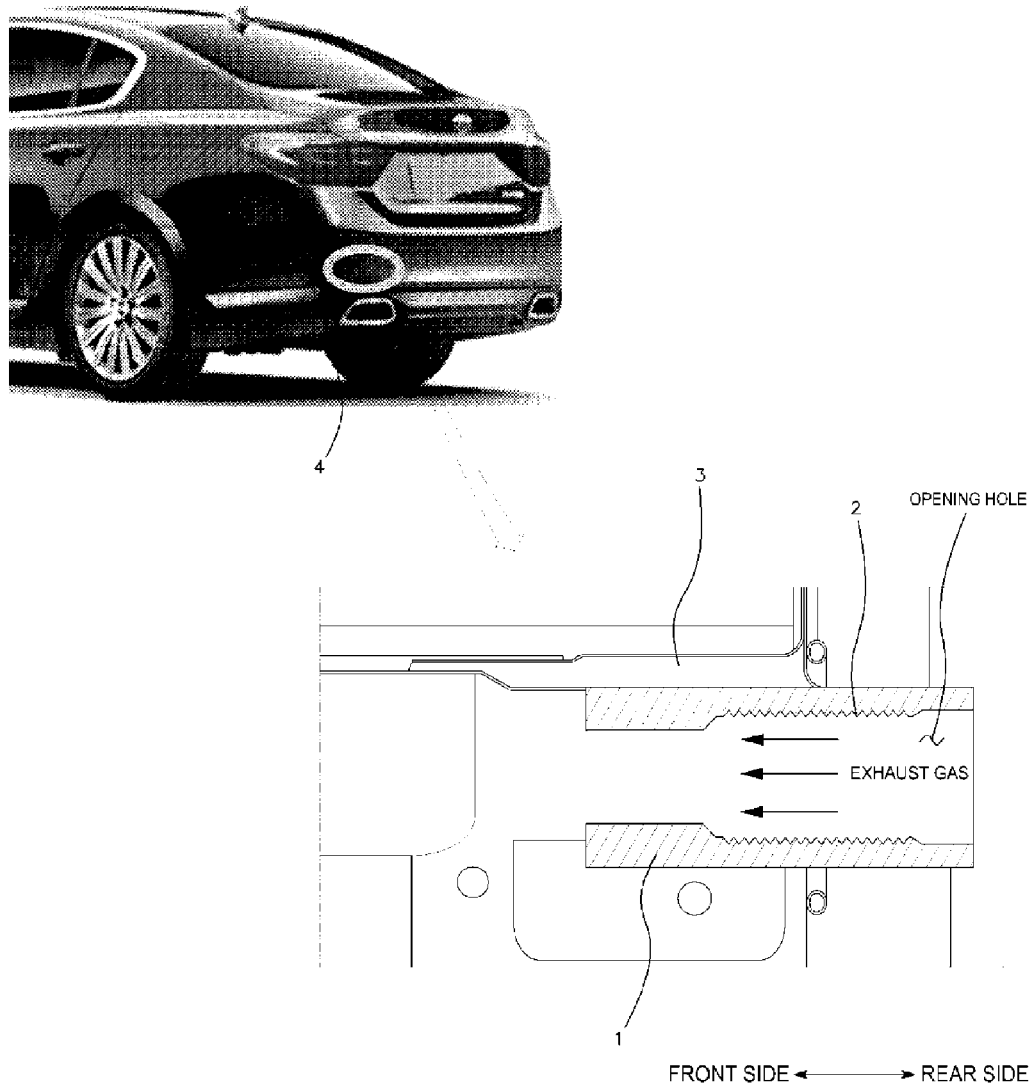
FIG. 1A illustrates a position where a towing pipe of the related art is attached above an exhaust pipe at a rear side of a vehicle.
FIG. 1B is a cross-sectional view illustrating a state where a towing pipe of the related art is attached.
Figure 2A:
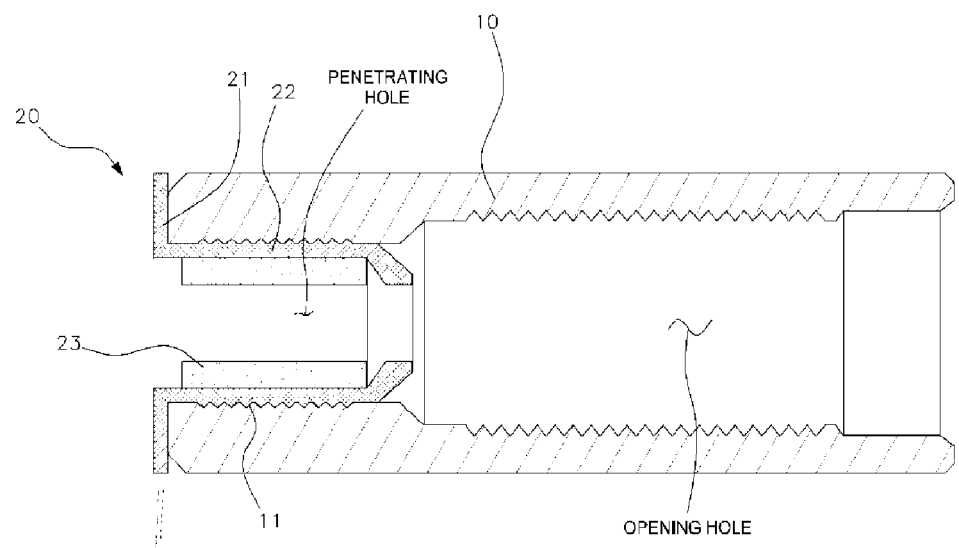
FIG. 2A illustrates a cross-sectional view of an exemplary apparatus including a towing pipe according to the present invention.
Figure 2B:
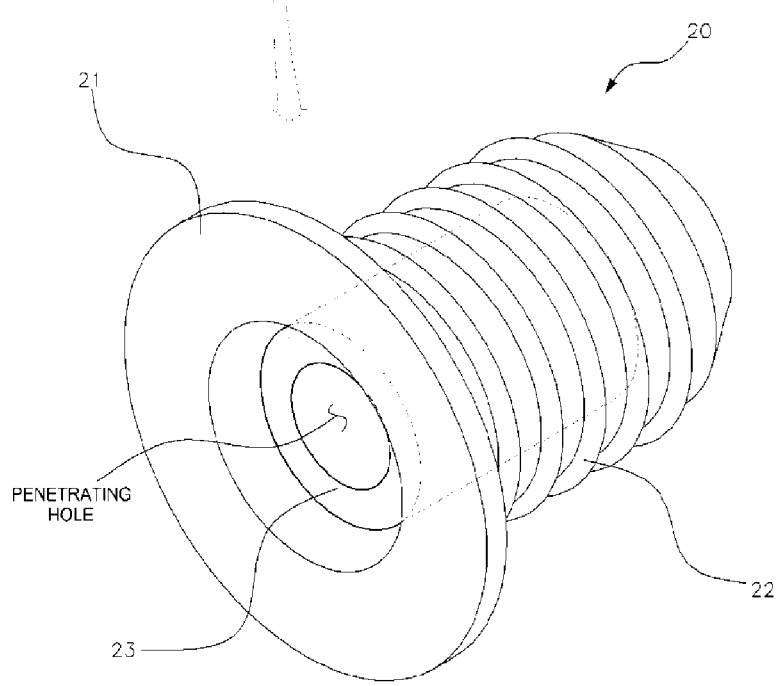
FIG. 2B illustrates a perspective view of an exemplary cap according to the present invention.

FIG. 2A illustrates a cross-sectional view illustrating a state where a cap 20 according to a first exemplary embodiment of the present invention is connected to a towing pipe 10 according to the first exemplary embodiment and FIG. 2B is a perspective view of the cap 20. Referring to the drawings, a screw thread to which a towing hook is connected is formed at one side (which the towing hook enters) of an opening hole of the towing pipe 10 according to the first exemplar embodiment, and a female screw thread 11 into which the cap is screwed is formed at the other side.

A body of the cap 20 according to the first exemplary embodiment includes a head 21 that has an increased diameter so as to have a typical bolt shape and closely comes in contact with an end of the towing pipe 10; and a screw 22 that protrudes from one side of the head 21 to enter the opening hole and has a screw thread formed at an outer circumferential surface so as to be screwed. Further, an expanded pad 23 is attached into a penetrating hole penetrating through the head 21 and the screw 22 in a longitudinal direction of the screw 22.

The expanded pad 23 has a pipe shape so as to closely come in contact with the inside of the screw 22, and allows the opening hole to be opened to the outside until the expanded pad is expanded (until the volume of the expanded pad is expanded by being heated).

Figure 3A:
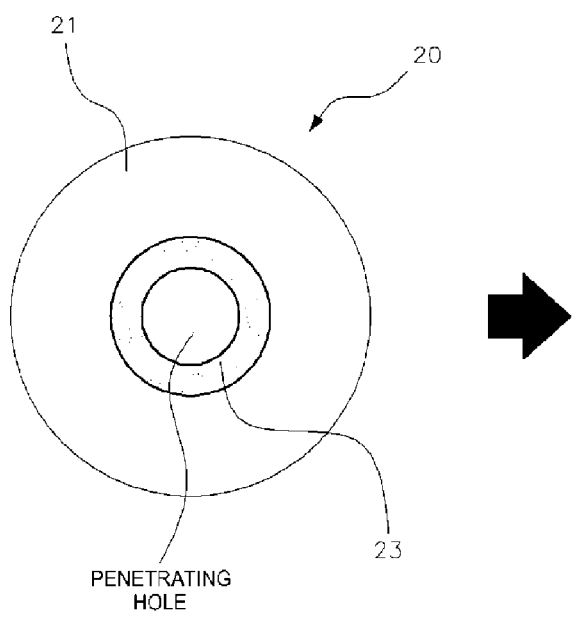
FIG. 3A and FIG. 3B are diagrams illustrating a state where an opening hole is closed by expansion of an expanded pad provided inside the cap illustrated in FIG. 2A and FIG. 2B.
Figure 3B:
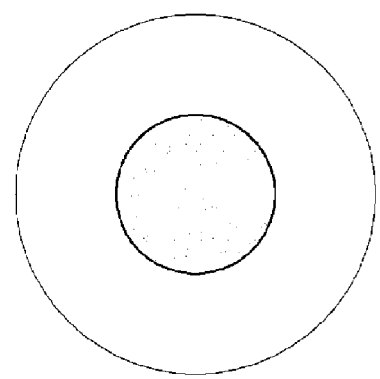

Accordingly, since an electro-deposition liquid can pass through the opening hole, the electro-deposition process may be performed on the towing pipe 10 while the cap 20 is attached. After the electro-deposition process is finished, when the towing pipe 10 is heated in order to heat-dry the electro-deposition liquid, a volume of the expanded pad 23 is expanded to close the opening hole as illustrated in FIGS. 3A and 3B.

More specifically, in a structure of the first exemplary embodiment, in order to more tightly seal between the cap 20 and the towing pipe 10, a sealer is additionally coated along a circumference of the head 21, or the cap may have a shape of a bottle cap or a shape of a cap of a camera film container so as to allow an outer circumferential surface of the towing pipe 10 to partially enter the inside of the head 21.

A cap 40 according to a second exemplary embodiment of the present invention has a configuration illustrated in FIGS. 4A-4C. Referring to the drawings, a body of the cap 40 includes a ring plate 41 that has a ring shape and comes in contact with an end of a towing pipe 30 according to the second exemplary embodiment; and a plurality of legs 42 that protrudes from one side of the ring plate 41 to be spaced apart from each other along a circumference. Moreover, a penetrating hole is formed between the legs 42, and a pipe-shaped expanded pad 44 is inserted into the penetrating hole.

As illustrated in FIGS. 5A and 5B, an engagement part 31 protrudes from an inner circumferential surface of an opening hole of the towing pipe 30 according to the second exemplary embodiment of the present invention, and wings 43 that are bent so as to allow a diameter to be increased are formed at ends of the legs 42.

The wings 43 pass through the engagement part 31 until the expanded pad 44 expands. Furthermore, after the electro-deposition process is performed on the towing pipe 30 while the cap 40 is inserted and the expanded pad 44 expands during the heat-drying process, the wings 43 come in contact with the engagement part 31 to prevent the legs 42 from being separated. That is, the legs 42 are deformed so as to be fixed to an inner circumferential surface of the opening hole by the expansion of the expanded pad 44.

As stated above, in accordance with the towing pipe provided with the cap according to the present invention, both ends of the opening hole are opened during the electro-deposition process so as to allow the electro-deposition liquid to flow, and after the electro-deposition process is finished, the expanded pad expands in the heat-drying process of heating the towing pipe to close the opening hole. Accordingly, it is possible to perform a conventional electro-deposition process and heat-drying process by only attaching the cap to the towing pipe without additionally performing a separate process.

For convenience in explanation and accurate definition in the appended claims, the terms "inner" or "outer", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus comprising:
   a cap that includes a body having opened ends and an expanded pad attached to an inner circumferential surface of the body; and
   a towing pipe connected to one end of the cap, the towing pipe having an opening hole formed therein and an engagement part protruding from an inner circumferential surface of the opening hole, wherein
   the expanded pad does not close the opened ends of the body before being heated, expands when being heated, and closes the opened ends of the body after being heated,
   the body includes a ring-shaped ring plate and a plurality of legs protruding from one side of the ring plate and spacing apart from each other along a circumference of the ring plate,
   the plurality of legs includes wings formed at ends of the plurality of legs, and
   the plurality of legs are bent radially outwardly by expansion of the expanded pad such that the wings come in contact with the engagement part to prevent the plurality of legs from being separated after the expanded pad has expanded.

2. An apparatus comprising:
   a cap that includes a body having opened ends and an expanded pad attached to an inner circumferential surface of the body; and
   a towing pipe connected to one end of the cap, the towing pipe having an opening hole formed therein and a female screw thread formed on an inner circumferential surface of the towing pipe, wherein
   the expanded pad does not close the opened ends of the body before being heated, expands when being heated, and closes the opened ends of the body after being heated,
   the body includes a head having an increased diameter and a screw that protrudes from one side of the head and has a screw thread formed at an outer circumferential surface,
   the head and the screw are opened in a longitudinal direction of the body, and
   the screw is screwed into the female screw thread of the towing pipe.

* * * * *